US 6,275,376 B1

(12) United States Patent
Moon

(10) Patent No.: US 6,275,376 B1
(45) Date of Patent: Aug. 14, 2001

(54) PORTABLE COMPUTER DISPLAY TILT/SWIVEL MECHANISM AND METHOD

(75) Inventor: Joung-Nam Moon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/419,775

(22) Filed: Oct. 18, 1999

(30) Foreign Application Priority Data

Oct. 16, 1998 (KR) .................................................. 98-43763

(51) Int. Cl.⁷ ........................................................ H05K 7/16
(52) U.S. Cl. ........................... 361/683; 361/727; 345/168; 364/708.1
(58) Field of Search ................................. 361/680, 681, 361/724–727, 679, 683; 345/168, 169, 905; 400/489, 682, 691–693; 312/208.1, 208.4; 341/22; 364/708.1

(56) References Cited

U.S. PATENT DOCUMENTS

| | | | |
|---|---|---|---|
| 4,395,010 | 7/1983 | Helgeland et al. | 248/371 |
| 4,453,687 | 6/1984 | Sweere | 248/183 |
| 4,494,720 | 1/1985 | Gregory | 248/371 |
| 4,542,872 | 9/1985 | Marino et al. | 248/183 |
| 4,555,081 | 11/1985 | Ermanski | 248/183 |
| 4,570,892 | 2/1986 | Czech | 248/372.1 |
| 4,621,782 | 11/1986 | Carlson et al. | 248/183 |
| 4,858,864 | 8/1989 | Thompson | 248/178 |
| 4,919,387 | 4/1990 | Sampson | 248/921 |
| 5,016,849 | 5/1991 | Wu | 248/183 |
| 5,034,858 | 7/1991 | Kawamoto et al. | 361/680 |
| 5,168,423 | 12/1992 | Ohgami et al. | 361/681 |
| 5,206,790 | 4/1993 | Thomas et al. | 361/681 |
| 5,276,589 | 1/1994 | Bartlett et al. | 361/681 |
| 5,335,142 | 8/1994 | Anderson | 361/681 |
| 5,345,362 | 9/1994 | Winkler | 361/681 |
| 5,390,075 | * 2/1995 | English et al. | 361/683 |
| 5,708,561 | 1/1998 | Huilgol et al. | 361/681 |
| 5,751,544 | * 5/1998 | Song | 361/681 |
| 6,125,029 | * 9/2000 | Sasaki et al. | 361/681 |

* cited by examiner

Primary Examiner—Leo P. Picard
Assistant Examiner—Hung Van Duong
(74) Attorney, Agent, or Firm—Robert E. Bushnell, Esq.

(57) ABSTRACT

A portable computer having a hinge assembly which allows the cover and display screen to be tilted from the base of the portable computer and then swivelled about a vertical axis. The hinge assembly can include a stopper to limit the amount of tilt and swivel. The cover of the portable computer can be tilted backwards from a closed position to 135° and swivelled 182° from a straight-forward position in a clockwise direction.

29 Claims, 11 Drawing Sheets

PORTABLE COMPUTER DISPLAY TILT/ SWIVEL MECHANISM AND METHOD

CLAIM OF PRIORITY

This application makes reference to, incorporates the same herein, and claims all benefits accruing under 35 U.S.C. § 119 from my application A PORTABLE COMPUTER filed with the Korean Industrial Property Office on Oct. 16, 1998 and there duly assigned Ser. No. 43763/1998.

FIELD OF THE INVENTION

The present invention relates to portable computer display, and more particularly to a portable computer display screen which can tilt and swivel about two orthogonal axes.

BACKGROUND OF THE INVENTION

Beginning in the mid-1980's, portable computers, alternately known as either laptops or notebook computers, have expanded in popularity and at an astonishing rate. Such computers are lightweight and have a display screen supported by a hinged cover that protects the keyboard when the computer is not being operated.

Liquid crystal displays (LCDs) are used in many personal computer screens. Liquid crystal displays (LCDs) are desirable for personal computers in that they are lightweight and have an extremely low power consumption in contrast to cathode ray tube (CRT) displays of conventional desktop computers. In addition, a Liquid crystal display (LCD) generally retains a great clarity of display in the presence of bright light.

All of the recent technological advances in portable computer displays have been directed toward improving the visual clarity of the information for a single operator sitting directly in front of the keyboard. However when the user of a portable computer wants to show the displayed information to other people, they either crowd behind the personal computer or physically turn the computer base to show the information. Given that the typical size of portable computers are smaller that a brief case, and the screen for such portable computer is likewise small, it is typically awkward for more than one or two people to view the display of a laptop computer. Furthermore, a sudden movement of a computer while the disk is spinning can induce a head crash. Thus, there is a need for a personal computer which can easily display the information on the display screen to more than one person and at various orientations or positions without having to shift the base of the computer.

In addition, one way to input data on screen is by using a stylus as is widely used in recent portable computers. It is inconvenient, however, to input the data using a stylus on the display screen because the cover, incorporating a display screen, is generally used to tilt about a horizontal line to approximately 110° (where 0° is the fully closed position of the cover) when used. Thus, there is a need for a portable computer which can input data on the screen using a stylus freely.

U.S. Pat. No. 4,395,010 to Helgeland, et al. entitled Device For The Setting Up Of a Data Display Device On a Work Surface, disclose a system for setting up a data display device on a work surface, functions for elevation adjusting, for rotating, and for swiveling the data display device. It is disclosed the system has a stand with a telescope member adjustable in height thereon. A base plate is attached thereupon, and a rotary plate is supported on the base plate. The rotary plate has an arch upon which sliding elements are guided, and to which the data display device is fastened.

U.S. Pat. No. 4,453,687 to Sweere entitled Swivel/Tilt Mounting Device For A Cathode Ray Tube, discloses a device for mounting a cathode ray tube to both tilt and swivel in order to provide a most advantageous angle at a working station. It is disclosed a cross-piece is rotatably mounted in a base and a mounting plate is designed to tilt about the cross-piece, there being a frictional engagement between the cross-piece and a portion of the mounting plate. This frictional engagement has provision for varying the amount of friction so as to lock or allow varying difficulty of tilt depending on the weight of the device to be mounted and the desire of the operator.

U.S. Pat. No. 4,494,720 to Gregory, et al. entitled Tilt Swivel Base, disclose a tilt swivel base for a video terminal that includes a lower section which is supported by way of a swivel so that the lower section can be swiveled relative to a supporting surface. It is disclosed an upper section is supported on the lower section, the two sections mating at surfaces which are curved from the front to the back of the base about an imaginary axis which is located appreciably above the base. The upper section is movable relative to the lower section forwardly and rearwardly so as to adjust the tilt angle of the upper section and of a terminal supported thereby relative to the supporting surface.

U.S. Pat. No. 4,542,872 to Marino, et al. entitled Terminal With Tilt-Swivel Display, disclose a display terminal device including a tilt and swivel coupling mechanism coupling the display portion to the base portion is disclosed the coupling mechanism includes a swivel plate rotatable about a vertical neck extending from the base portion. The swivel plate includes a cylindrical top surface on which a complementary cylindrical surface of the display portion is seated. The cylindrical surfaces are spring biased toward each other by a spring mounted on a fastener extending from the display portion to the swivel plate. It is disclosed a horizontal fastener extends from the housing through horizontal slots in the neck.

U.S. Pat. No. 4,555,081 to Ennanski entitled Tiltable And Swivable Mounting assembly For A Video Display Terminal, discloses a mounting assembly for use in mounting a video display terminal on the top surface of a workstation stand which can be tilted back and forth to allow the video display terminal to be positioned for the most comfortable, glare-free viewing and which can be swiveled about a vertical axis to change the viewing direction.

U.S. Pat. No. 4,570,892 to Czech, et al. entitled Tiltable Rotating Display Monitor Mount, disclose a support base for a display monitor that provides for the rotation and stable orientation of the monitor over a range of tilt angles. It is disclosed an upper portion of the base is adapted to receive a turntable having an upper concave surface adapted to receive a complementary convex lower portion of the display monitor's cabinet. The concave surface of the turntable includes a first pair of spaced guide rails adapted to receive and engage respective complementary guide rail assemblies positioned on the convex lower portion of the monitor. It is disclosed the convex lower portion of the cabinet is further provided with a pair of spaced projections for insertion within respective elongated apertures in the turntable which are parallel to and in spaced relation with its guide rails. It is disclosed each of these projection assemblies includes engaging means such as the combination of a spring washer and coiled spring for engaging the turntable adjacent to a respective elongated aperture in maintaining the monitor firmly positioned within the turntable's concave surface. It is disclosed a biasing arrangement urges the monitor in a first direction of rotation within the turntable's concave surface which is opposite to the rotational moment of the monitor due to its center of gravity. The lower surface of the turntable is provided with a pair of spaced bosses which are adapted for insertion within and engagement with a respective arcuate slot in the upper surface of the base to provide secured coupling between the base and the turntable and allow for rotational displacement therebetween.

U.S. Pat. No. 4,621,782 to Carlson, et al. entitled Arrangement For Mounting Apparatus, disclose an apparatus for mounting a movable superstructure on a fixed base. The superstructure, a video display unit, is attached to a cylindrical segment journal which rests on a matching cylindrical segment socket. The journal rotates within the socket as the video display unit is tilted back and forth. It is disclosed two helical springs are each attached to the superstructure and the base in such a way as to counteract gravitational forces and to tend to restore the superstructure to a neutral tilt angle when it is moved therefrom. It is disclosed the surfaces of the journal and socket have enough friction to exceed the relatively small differences between the gravitational forces tending to move the superstructure further from the neutral tilt angle and the spring forces tending to restore the superstructure thereto.

U.S. Pat. No. 4,858,864 to Thompson entitled Tilt And Swivel Mechanism, discloses a tilt and swivel mechanism that includes a base on which is placed a rocker. It is disclosed the rocker moves in a rocking motion with respect to the base. The rocker is prevented from moving in a sliding motion with respect to the base.

U.S. Pat. No. 4,919,387 to Sampson entitled Tilt and Swivel Support Apparatus, discloses a support apparatus for adjusting tilt and swivel of a supported product, specifically a visual display device such as a computer monitor. It is disclosed the swivel mechanism permits the display device to be swivelled through a rotational angle greater than 360°, or greater than 180° in each direction from a front reference position. It is disclosed the tilt mechanism utilizes a stack of elongate torsion springs or bars with the stack's mid-portion fixed against longitudinal rotation and with its ends rotatable, including means for providing resistance to such rotation, for counter-balancing the torque produced by the display device in its various tilt positions.

U.S. Pat. No. 5,034,858 to Kawamoto, et al. entitled Electronic Information Equipment, disclose an electronic information equipment constructed to accommodate a keyboard sandwiched between a main body and a display. It is disclosed the display is attached to the main body by a supporting device at a position where the display face is movable to a predetermined position. It is disclosed the supporting device includes rotating device portions and tilting device portions. The rotating device portions rotate the display in the horizontal direction about an axis intersecting the installation plane. It is disclosed the tilting device portions rotate the display at a vertical direction with respect to the main body for supporting the display face at a position intersecting the installation face at an arbitrary angle.

U.S. Pat. No. 5,335,142 to Anderson entitled Portable Computer Display Tilt/Swivel Mechanism, discloses a portable computer having a hinge assembly which allows the cover and display screen to be tilted from the base of the portable computer and then swiveled about a vertical axis. It is disclosed one hinge is provided at the rear edge of the base of the portable computer about which the cover both tilts and swivels. The hinge assembly includes stops which limit the amount of tilt and swivel. It is disclosed the cover of the personal computer can be tilted backwards from a closed position to 115° and swiveled 30° from a straight-forward position.

SUMMARY OF THE INVENTION

It is therefore an object among other objects of the present invention to provide a personal computer which can easily display the information to more than one person without having to shift the base of the computer.

It is another object among objects of the present invention to provide a portable computer which can input data on the display screen using a stylus freely.

In order to attain the above objects and other objects of the present invention, according to an aspect of the present invention, the present invention provides a tilt and swivel mechanism which allows adjustment of a portable computer display in two axes. The mechanism provides tilt movement of a display from a horizontal closed position to an open position of approximately 135° from the closed position. The invention also provides for swiveling of the display about a vertical axis in a range of 180° to an angle in a clockwise direction from a directly straight-forward position.

In accordance with a preferred embodiment of the present invention, the portable computer having the tilt/swivel mechanism includes a base, a cover incorporating a display screen, and a hinge assembly connecting the cover and the base and having a first shaft oriented horizontally relative to the base and a second shaft oriented perpendicularly to the first shaft. The hinge assembly is rotatively movable in or about two axes to permit the cover to tilt relative to the base about a first axis of rotation and to swivel about a second axis of rotation oriented perpendicularly to the first axis of rotation. The portable computer also includes a cable connecting the cover and the base electrically, the cable being arranged to pass along and be wound about the hinge assembly.

A preferred tilt/swivel hinge assembly for a portable computer according to the present invention desirably includes a first block coupled to the base of the portable computer and the first shaft to enable the cover of portable computer to tilt about the first axis of rotation, a second block connecting the first shaft to enable the cover of the portable computer to swivel about the second axis of rotation, and a support provided within the cover and coupled to the second block by the second shaft to support the cover of the portable computer.

In a preferred embodiment, the cable desirably includes first through fourth parts. The first part and the third part of the cable are oriented horizontally relative to the base of the portable computer when the cover is oriented perpendicularly to the base in an open position, and the second part and the fourth part of the cable are oriented vertically relative to the base when the cover is oriented perpendicularly to the base in an open position. The cable is passed along the second shaft and the third part of the cable is wound about the second shaft until the bent of the cable reaches the second shaft, the third part is folded so that it is located behind the first shaft, then the fourth part of the cable is rotated about the first shaft to connect with a system unit located in the base of the portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DESCRIPTION OF THE PREFERRED EMBODIMENTS

The present invention discloses an improved hinge assembly for notebook or laptop personal computers. The hinge assembly allows the computer display screen to not only be tilted open, but also be swivelled approximately 180° about a vertical axis relative to the base of the personal computer. The present invention can also have applicability to other devices having a base and a cover incorporating an electrical display, such as a video or electronic display.

Figure 1A:
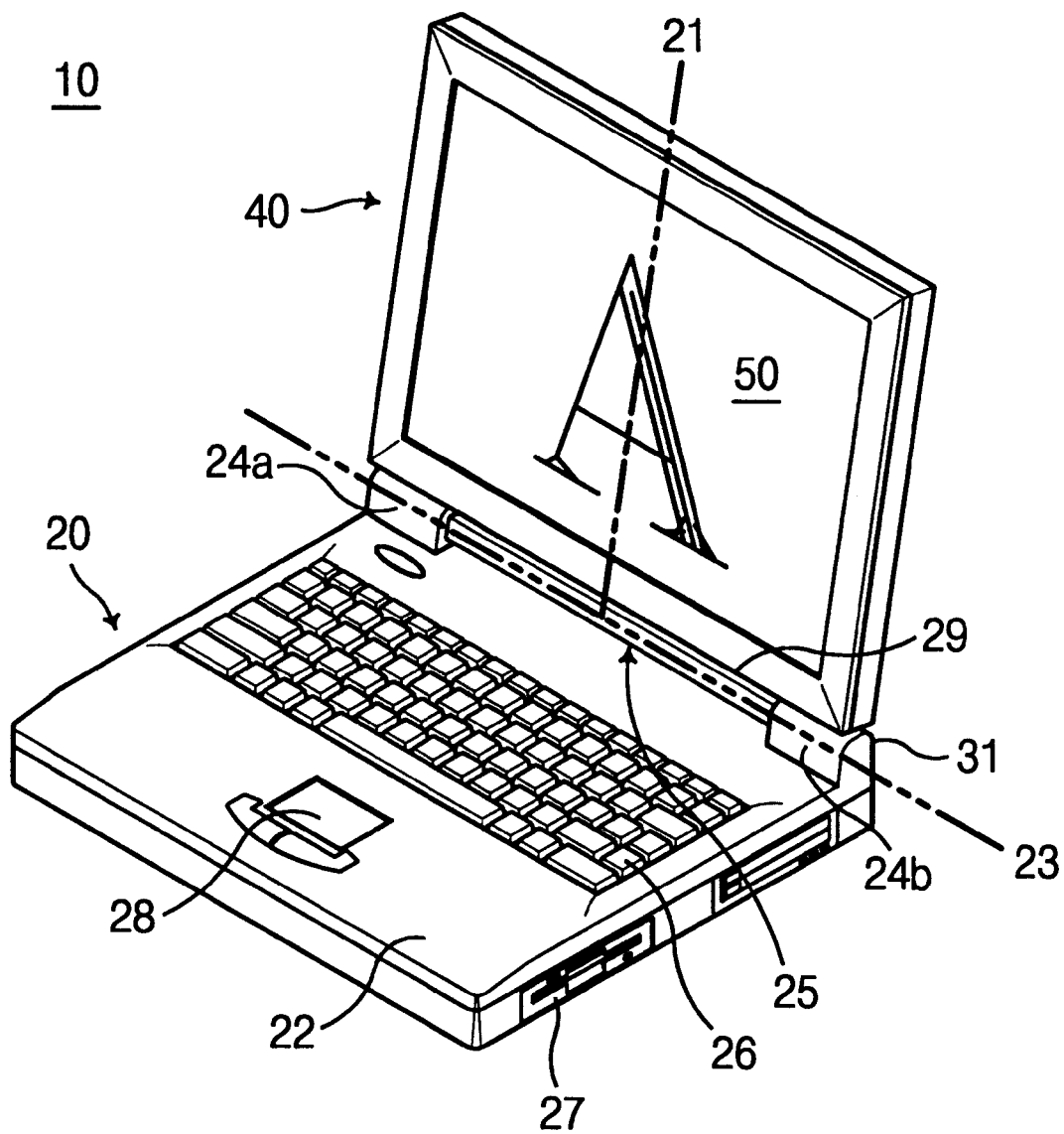
FIG. 1A is a perspective front view showing a portable computer according to the present invention incorporating a tilt/swivel hinge of the present invention with the display screen tilted in an open position.

Referring to FIG. 1A, a notebook type portable computer 10 is shown with cover 40, incorporating a display screen 50, tilted in an open position. The portable computer 10 generally includes a base 20, and the cover 40 attached to the base 20 with a tilt/swivel hinge assembly or mechanism 25. The base 20, including a hard drive (not shown), includes a keyboard panel 26, a floppy disk access port 27, a panel 22, a pointing device 28 and rear steps 24a and 24b. The tilt/swivel hinge mechanism or assembly 25 is located between rear steps 24a and 24b. Other notebook computer designs or laptop computer designs or other devices can incorporate the tilt/swivel hinge mechanism 25 of the present invention and the illustrated embodiment should therefore not be construed in a limiting sense.

Referring to FIGS. 1A through 1D, in that the tilt/swivel hinge assembly 25 is rotatively movable about two axes, such as axes 21 and 23 of FIG. 1A, the computer display cover 40 rotates about two axes 21 and 23 relative to the base 20. In the closed position of the cover 40, a tilt axis or first axis 23 runs parallel to a rear or bottom edge 29 of the display cover 40. A swivel axis or second axis 21 passes directly through the center of the tilt/swivel hinge 25 and is oriented perpendicularly to the tilt axis or first axis 23. From a closed position, the cover 40 lifts open, or tilts, about the tilt or first axis 23 to expose the keyboard 26 and the display screen 50. The cover 40 and the display screen 50 preferably tilt about the tilt or first axis 23 to a limit of 135° (where 0° is the fully closed position of the display cover 40). The display cover 40 and the display screen 50 can swivel in a clockwise direction indicated by arrows P and Q about the swivel or second axis 21 to a limit of 182° (where 0° is the position shown in FIG. 1A). It is preferred that the display cover 40 be fully open or tilted back before swiveling, yet the display cover is free to swivel about a swivel axis or second axis 21 at any tilt position greater than that necessary for the bottom edge 29 of the display cover 40 to clear the rear steps 24a and 24b.

Although the two axes, the second axis 21 and the first axis 23, remain perpendicular to each other during use of the portable computer 10, a tilt axis or first axis can also rotate relative to the base 20 about a second axis 21. As is apparent in FIG. 1B, the swiveling of the display cover 40 about a fixed swivel axis or second axis 21 allows the display cover 40 to tilt relative to the base 20 about a theoretically infinite number of first axes 23'.

Figure 1B:
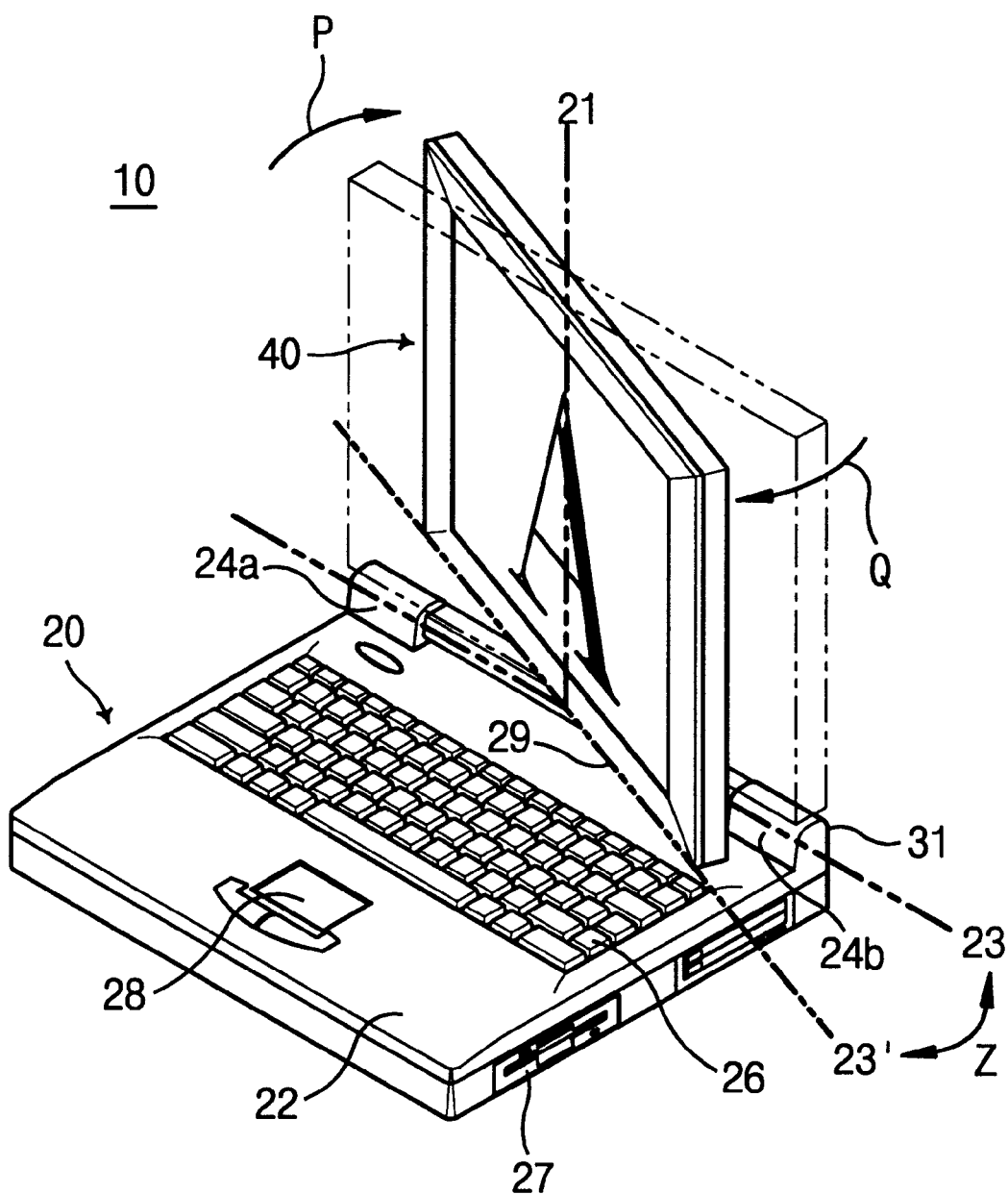
FIG. 1B is a perspective front view showing the portable computer of FIG. 1A incorporating a tilt/swivel hinge of the present invention with the display screen tilted open and swivelled 30° in a clockwise direction.

In a typical configuration as illustrated in FIG. 1B, the display cover 40 and the display screen 50 have been tilted open and swivelled clockwise from the original straight-on position, when viewed from above the portable computer 10. The first axis 23, originally parallel to the rear edge 31 of the base 20, has swivelled approximately 30° to a new first axis 23'. The new first axis 23' remains parallel to the rear edge 29 of the display cover 40, yet makes a 30° angle, for example, angle Z with the rear edge 31 of the base 20. The display cover 40 can thus tilt relative to the base 20 about the new first axis 23' which, in a preferred embodiment, can be oriented anywhere in the range of 180° (in clockwise direction or, alternatively, in a counter clockwise direction) from the original first axis 23.

Figure 1C:
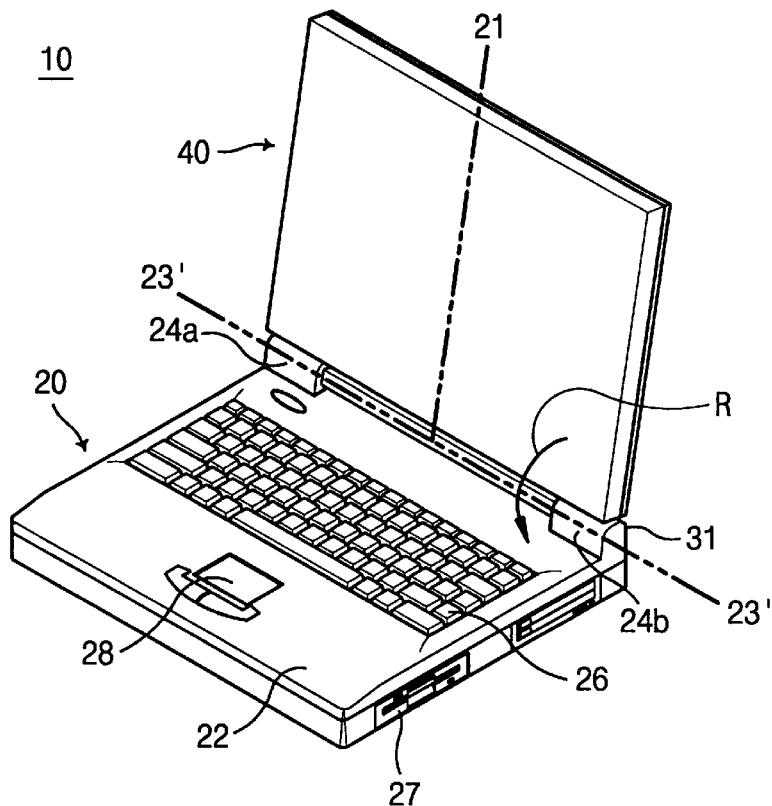
FIG. 1C is a perspective front view showing the portable computer of FIG. 1A incorporating a tilt/swivel hinge of the present invention with the display screen tilted in an open position and swivelled 180° in a clockwise direction.

Continuing with reference to FIGS. 1A through 1D, particularly referring to FIG. 1C, the display cover 40 and display screen 50 have been tilted open and swivelled 180° clockwise from the original straight-on position, when viewed from above the portable computer 10. The first axis 23, originally parallel to the rear edge 31 of the base 20, has swivelled about a swivel axis or second axis 21 approximately 180° to a new first axis 23'. The new first axis 23' remains parallel to the rear edge 29 of the display cover 40, yet makes a 180° angle with the rear edge 31 of the base 20. The display screen 50 is then faced in the opposite direction compared to the original straight-on position of display screen 50.

Figure 1D:
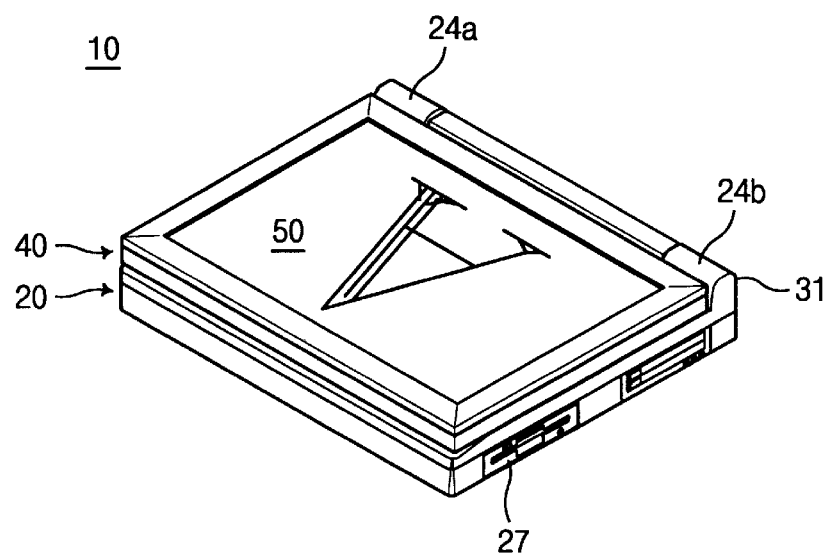
FIG. 1D is a perspective front view showing the portable computer of FIG. 1A incorporating a tilt/swivel hinge of the present invention with the cover in a closed position and the display screen faced in an upside position.
Figure 2:
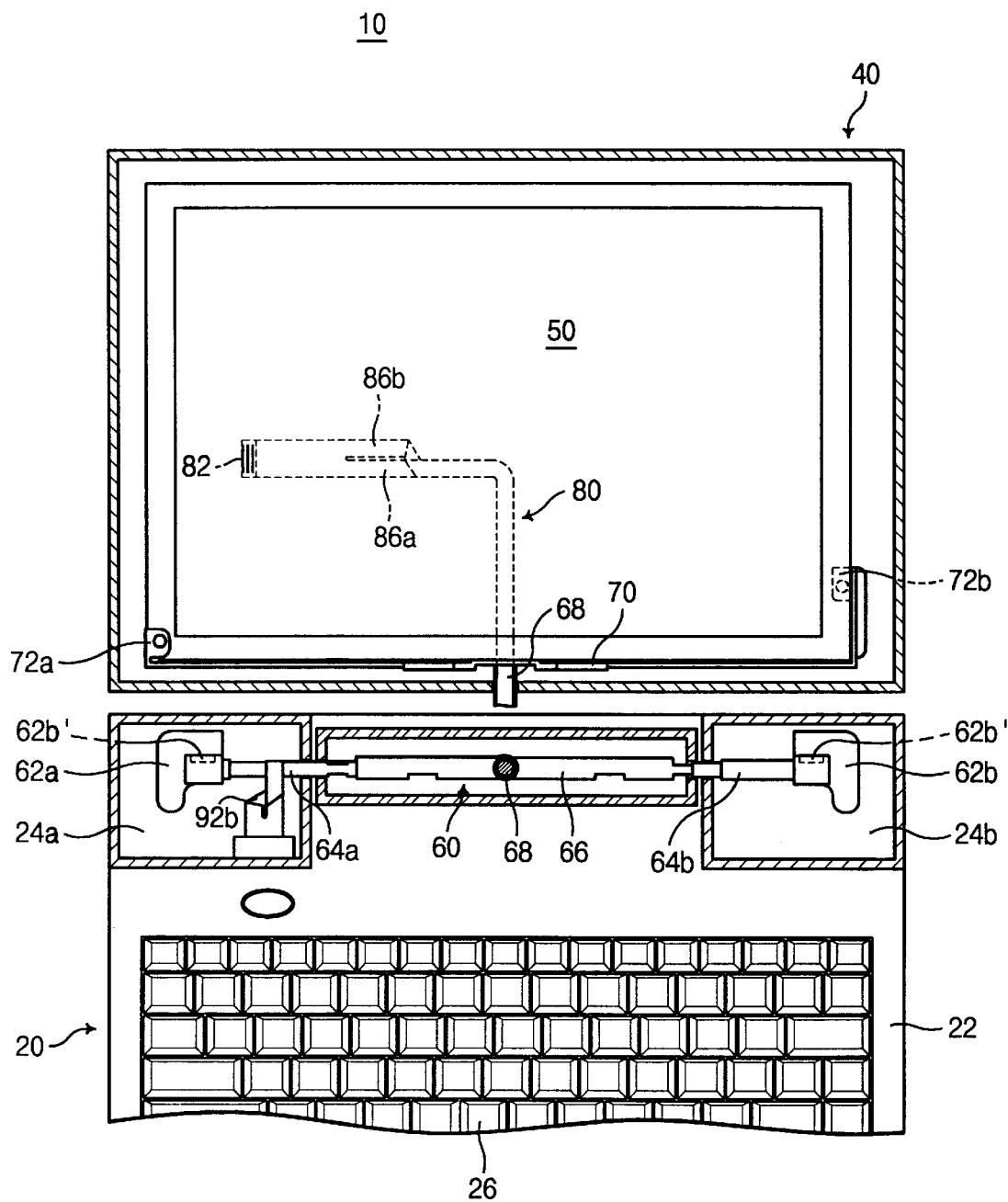
FIG. 2 is a diagram showing the portable computer of FIG. 1A incorporating a tilt/swivel hinge of the present invention.

Because the tilt/swivel hinge 25 freely tilts or pivots the display cover 40 in the regular range from a fully open position to a fully closed position and swivels the display cover 40 in the regular range of approximately 180°, the display cover 40 and display screen 50, pivoted about tilt axis or first axis 23, therefore folds closed as seen in FIG. 1D by moving in the direction of arrow R in FIG. 1C. Therefore, the display screen 50 is faced to the upside when viewed from above the portable computer 10. This upside position of the display screen 50, lying on the keyboard 26, advantageously make inputting data with a stylus easy and comfortable as writing with a pen on a book.

Continuing with reference to FIGS. 2 through 4A, FIG. 2 illustrates base 20 and display cover 40 having display screen 50 coupled to hinge assembly 25 and cable 80 to provide display cover 40 capable of tilting and swiveling. With reference to FIGS. 2 through FIG. 4A, tilt blocks 62a and 62b, are respectively coupled to first shaft 60 at one end of respective first shaft portions 64a and 64b, and are respectively located within rear steps 24a and 24b, first shaft 60 being horizontally oriented relative to base 20. In one end of each of the tilt blocks 62a and 62b, a concave surface is formed to respectively join to the first shaft portions 64a and 64b. A swivel block 66 is located between first shaft portions 64a and 64b to join the two first shaft portions 64a and 64b to form first shaft 60. The swivel block 66 has a circular formed concave surface 66a to couple with a second shaft 68 to permit the second shaft 68 to rotate, second shaft 68 being vertically oriented relative to base 20 when the cover 40 is oriented perpendicularly to the base 20, and second shaft 68 also being oriented perpendicularly to the first shaft 60. One end of the second shaft 68 is engaged to the swivel block 66 and other end of the second shaft 68 is coupled to screen support 70. The screen support 70, coupling to display screen 50, includes locking plates 72a and 72b each having a thread hole at each end. In a preferred embodiment, it is desirable locking plate 72a makes the display screen 50 tightly hold in a forward direction relative to base 20, and locking plate 72b makes display screen 50 tightly hold in a backward direction relative to base 20. Cosmetic panels or panel assembly 100 and 110 can mount together to form a cab or enclosure to hide the tilt/swivel hinge or assembly 25 in both the closed and open configuration of display cover 40.

Due to a rotation of first shaft 60 including first shaft portions 64a and 64b and swivel block 66, the display cover 40 is capable of pivoting in the regular range, as previously described. The tilt blocks 62a and 62b respectively coupling to first shaft portions 64a and 64b, includes a stopper 62b, to prevent further rotation beyond a point, thus limiting the angle of tilt of the display cover 40. In a preferred embodiment, a hinge assembly of KATO SPRING, JAPAN is made as the tilt blocks 62a and 62b. Further, because second shaft 68 is capable of rotating, the display cover 40, supported and mounted on the vertical shaft 68, can be swivelled. Also, the swivel block 66 is made by KATO SPRING, JAPAN in a preferred embodiment.

Figure 3:
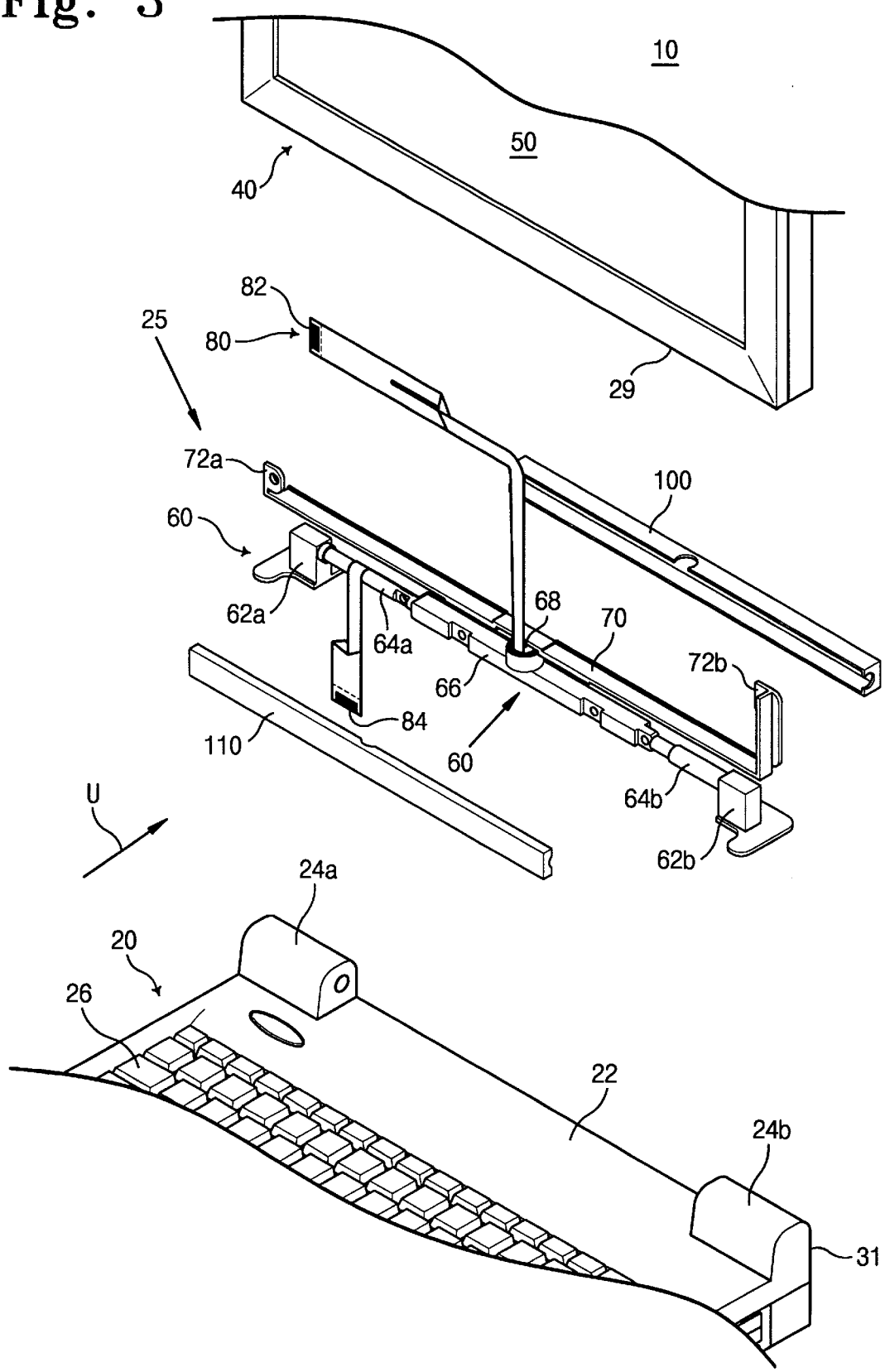
FIG. 3 is a perspective exploded view of the tilt/swivel hinge mechanism according to the present invention installed in the portable computer of FIG. 1A.
Figure 4A:
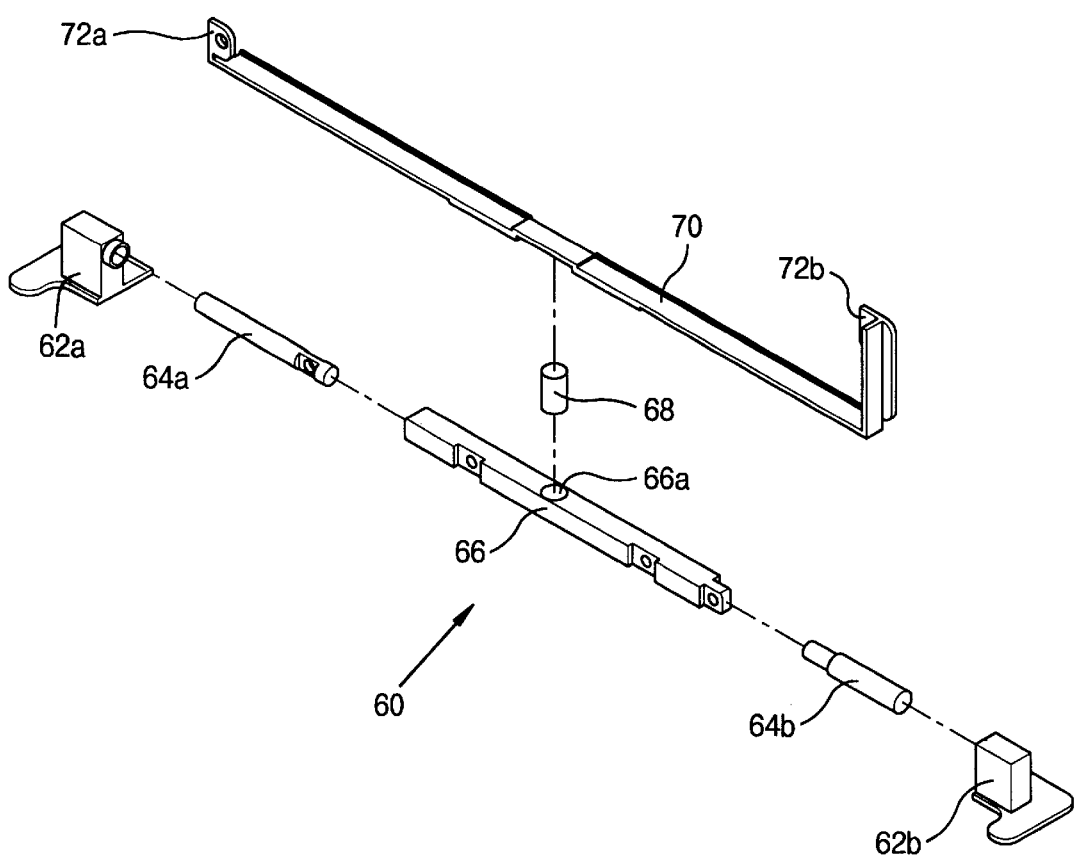
FIG. 4A is a detailed perspective exploded view of the tilt/swivel hinge of FIG. 3.
Figure 4B:
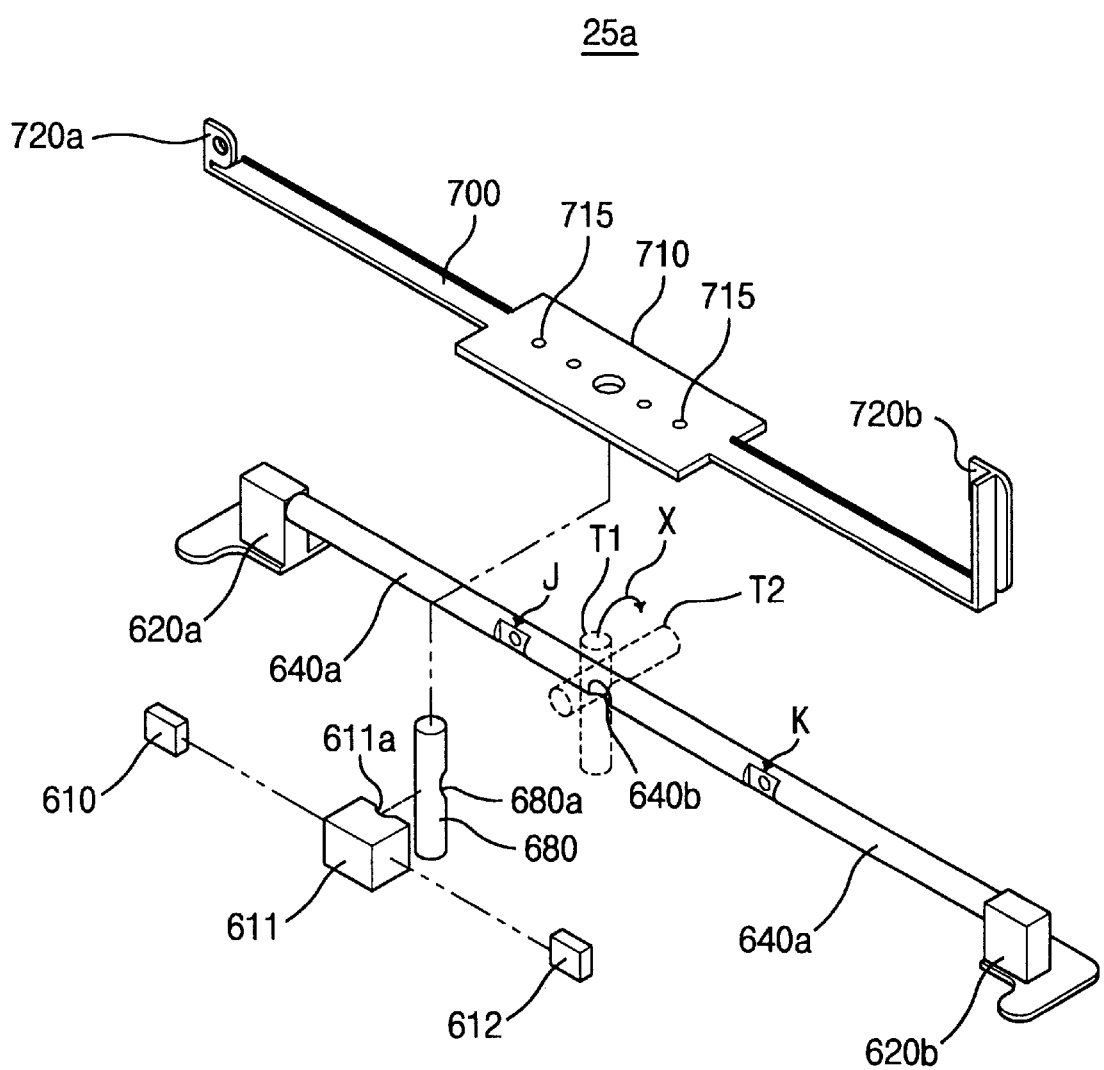
FIG. 4B is a perspective exploded view of a modification of a tilt/swivel mechanism according to the present invention as can be installed in the portable computer of FIG. 1A.

Additionally, FIG. 4B shows a modified tilt/swivel hinge mechanism 25a according to the present invention. In the modified hinge mechanism 25a, the fixing shaft 640a is disposed between two fixing members 620a and 620b. The fixing shaft 640a is not rotated and the fixing members 620a and 620b are mounted on the base 20 of computer 10 (FIGS. 1A–1D). The fixing shaft 640a has a concave surface 640b formed with a semi-circular type configuration. A rotation shaft 680 having a same-type concave surface 680a as concave surface 640b is coupled at the concave surface 640b. A first hinge-member 610 and a second hinge-member 612 are connected with a rotation block or a rotation member 611, and the first hinge-member 610 and the second hinge-member 612 are mounted on the fixing shaft 640a at positions J and K, for example. The rotation member 611 has a concave surface 611a formed with a same diameter as that of the rotation shaft 680 to be coupled to the rotation shaft 680. The first and second hinge-members 610 and 612, as tilting members, allow the rotation shaft 680 to be tilted within a predetermined regular angle using an elastic force. A screen support 700 is supported by the rotation shaft 680 and includes locking plates 720a and 720b which are similar in structure and function to locking plates 72a and 72b of screen support 70 (FIGS. 3 and 4A). The screen support 700 has a structure similar to the screen support 70 (FIGS. 3 and 4A) and, therefore, a detailed explanation thereof is omitted. Also, screen support 700 has a reinforcing member 710 having a plurality of screw-holes 715. The reinforcing member 715 is added or positioned in the middle of the screen support 700 to secure the combination of the cover 40 having display screen 50 and the screen support 700 of computer 10.

Continuing with reference to FIG. 4B, as illustrated by dotted lines T1 and T2 and the arrow X, the rotation shaft 680 is rotated around or about the fixing shaft 640a. When the rotation shaft 680 is disposed with a vertical length as illustrated by the dotted line T1, the concave surface 680a is contacted with the concave surface 640b and, in this state, the rotation shaft 680 is freely rotated. Whereas, when the rotation shaft 680 is disposed with a horizontal length as illustrated by the dotted line T2, the concave surface 680a is contacted with the outer surface of the fixing shaft 640a and, in this state, the rotation shaft 680 is not freely rotated. In the structure of FIG. 4B using the concave shape, the rotation of the modified tilt/swivel hinge mechanism 25a is accomplished at the specific position. In a preferred embodiment shown in FIG. 4B, when the display screen 50 of computer 10 (FIGS. 1A–1D) is tilted approximately 90°, the rotation shaft 680 is disposed vertically and, therefore, the rotation shaft 680 is freely rotated.

In the hinge mechanism 25a of FIG. 4B, the tilt can be freely executed within the predetermined regular angle, but the rotation can be executed at the specific position. In this regard, when the display screen 50 is tilted approximately 45°, the hinge mechanism 25 shown in FIG. 4A is capable of swiveling but the hinge mechanism 25a shown in FIG. 4B is not rotated due to the structure of the hinge mechanism 25a. For this reason, damage to keyboard 26 or the upper surface of the base 20 can be prevented due to the rotation of the display screen 50 in the hinge mechanism 25a shown in FIG. 4B.

Continuing with reference to FIGS. 2 through 6D, a representative cable 80 from the base 20 communicates with the display cover 40 and display screen 50. The cable 80 is a flat-type cable well known to one skilled in the art. In a preferred embodiment, the cable 80 has a 30 line and a depth of the cable 80 is 7 mm, for example. The cable 80 includes a first contact 82 connected to an electronic device of display screen 50 of the display cover 40 and a second contact 84 is connected to the base 20. Cable 80 includes a first separate line 86a and a second separate line 86b between the first contact 82 and the second contact 84. Each depth of the first separate line 86a and of the second separate line 86b is 3.5 mm and each separate line 86a and 86b has a 15 line, for example. The cable 80 can pass through the tilt/swivel hinge or assembly 25 in several ways. Because the cover 40 can be tilted 110° over and simultaneously swivelled approximately 180°, alternatively a conventional passage way of cable 80 through the tilt/swivel hinge assembly 25, for example, forming a slot to provide a pathway in the hinge assembly, can result in a twist of cable 80.

Figure 5A:
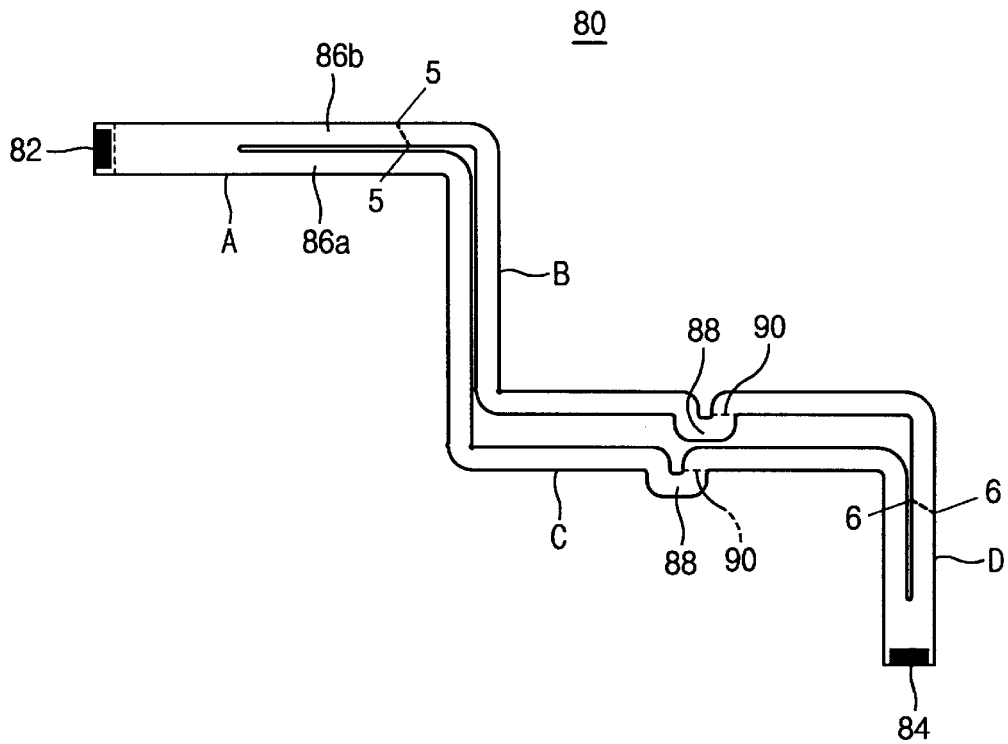
FIGS. 5A and 5B are diagrams showing how to fold the cable shown in FIGS. 2 and 3 according to the present invention.
Figure 5B:
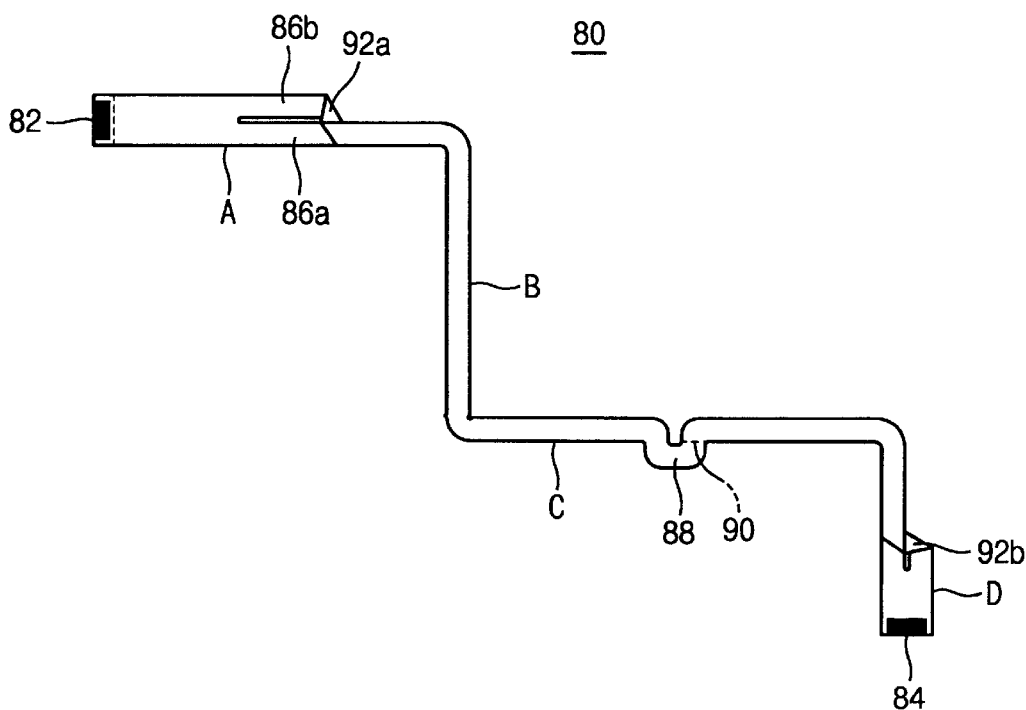

To prevent the cable from being twisted, according to the present invention, as illustrated in FIGS. 5A and FIG. 5B, the cable 80 has a first part A and a third part C oriented horizontally relative to base 20 when the cover 40 is oriented perpendicularly to base 20 in an open position, and has a second part B and a fourth part D oriented vertically relative to base 20 when the cover 40 is oriented perpendicularly to the base 20 in an open position, to wind easily about the second shaft 68. To reduce the depth of the cable 80, the second separate line 86b is folded along dashed line 5—5 and dashed line 6—6 in resulting in the second separate line 86b being located behind the first separate line 86a. From points 92a to 92b of cable 80, the folded second separate line 86b is located behind the first separate line 86a.

Figure 6A:
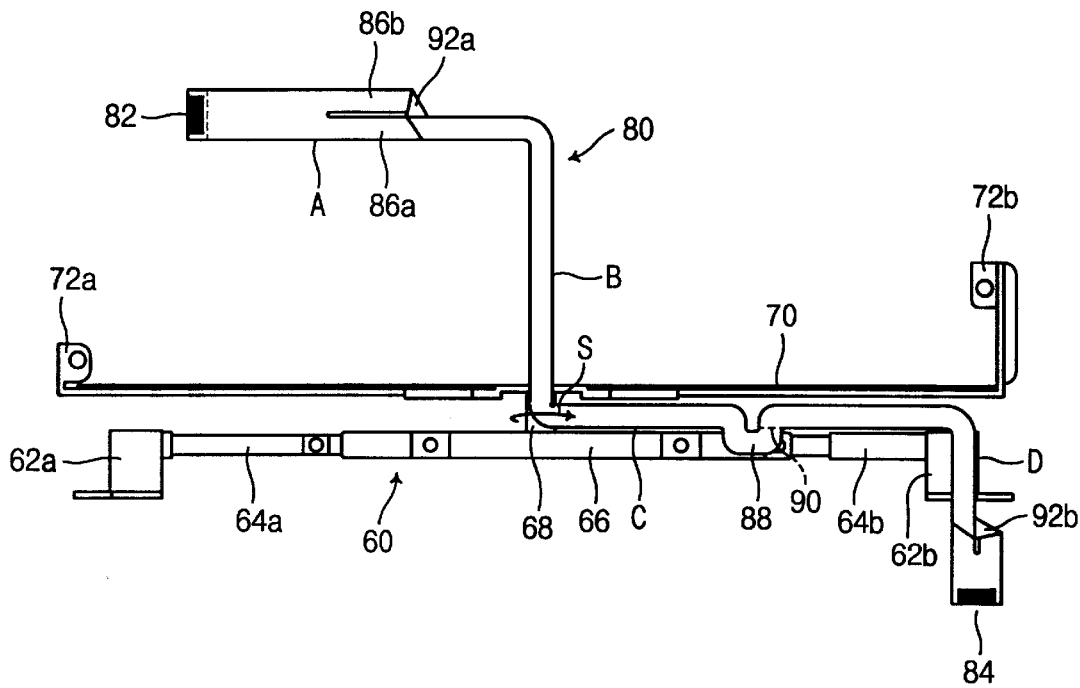
FIGS. 6A, 6B, 6C and 6D are diagrams showing how to couple the cable of FIGS. 2, 3, 5A, and 5B to a tilt/swivel hinge mechanism according to the present invention.
Figure 6B:
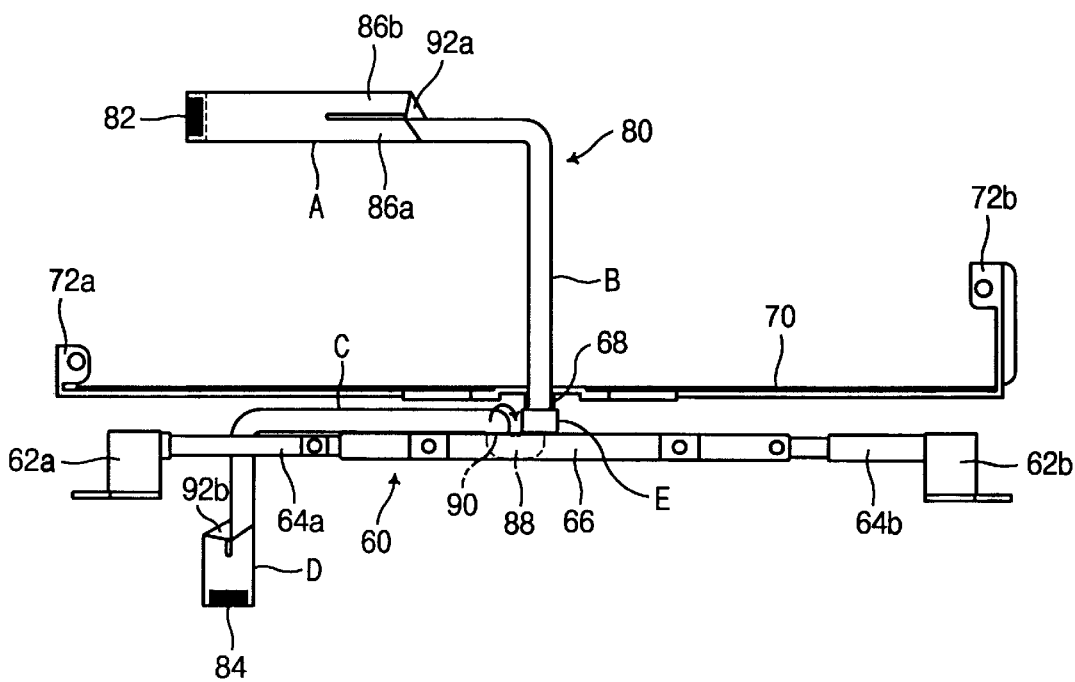
Figure 6C:
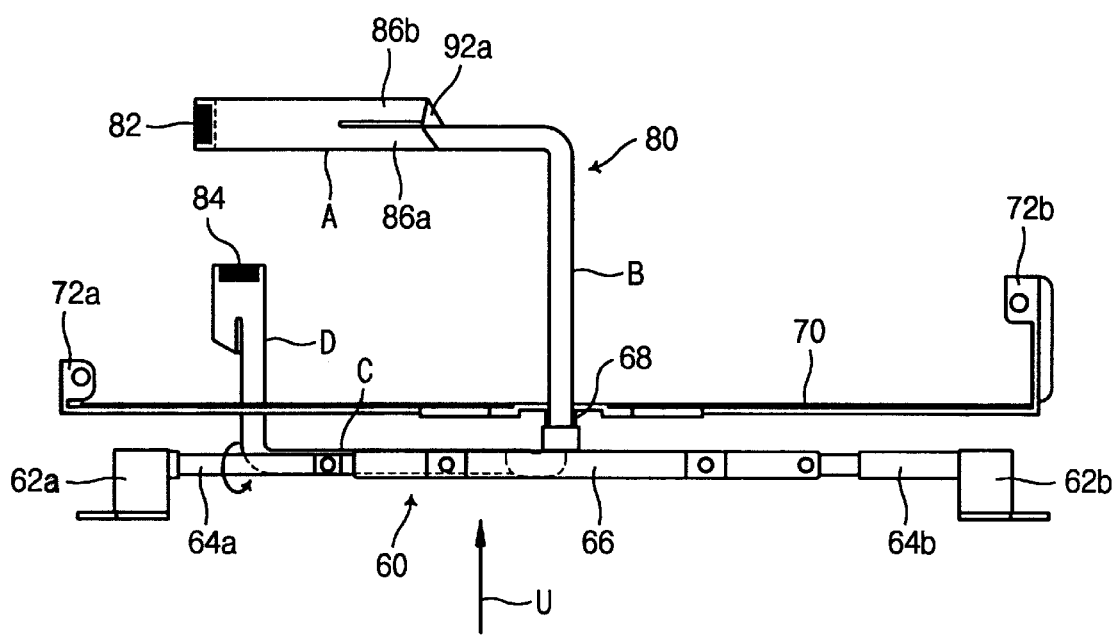
Figure 6D:
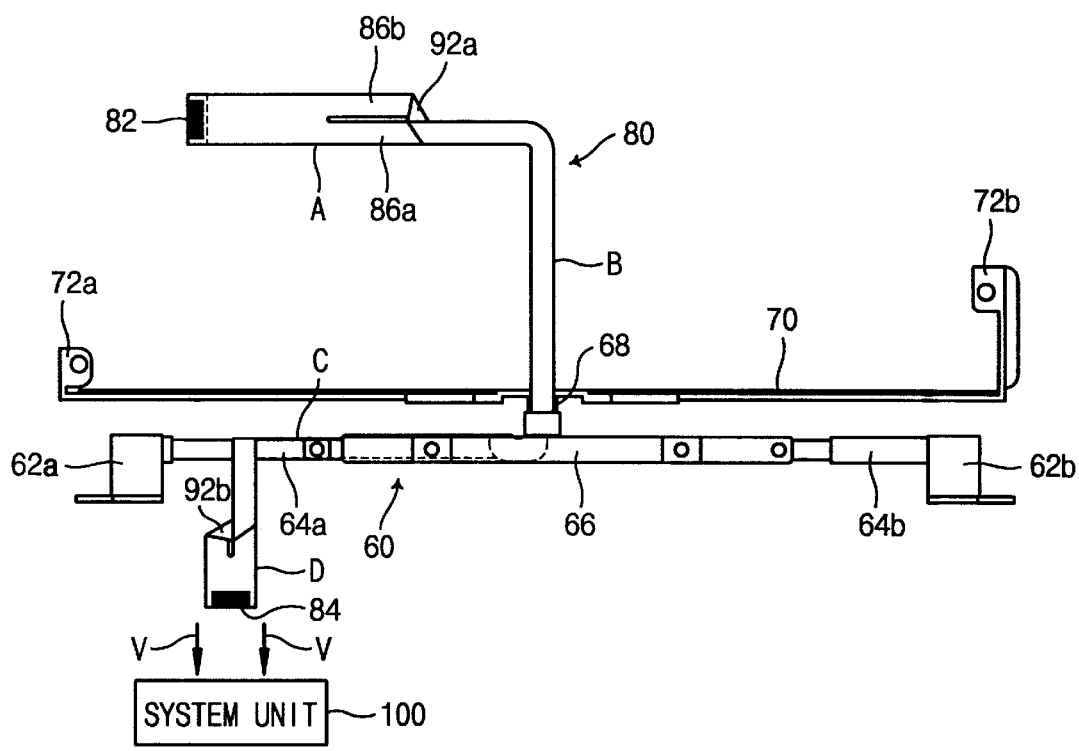

Referring to FIGS. 6A, 6B, 6C and 6D, FIGS. 6A through 6D illustrate a way to wind the cable 80 along second shaft 68 and first shaft 60 including first shaft portions 64a and 64b, as well as illustrate a way to similarly wind the cable 80 along the fixing shaft 640a and the rotation shaft 680 of FIG. 4B. Referring to FIG. 6A, the cable 80, reduced the depth, passes along the second shaft 68, and then is wound round the second shaft 68 as indicated by arrow S at the position in contact with the second shaft 68 and the swivel block 66. That is to say, the first part A of cable 80 and the second part B of cable 80 are passed along the second shaft 68 and the third part C of cable 80 and the fourth part D of cable 80 are rotated about the second shaft 68 along the direction as shown in FIG. 6A by the arrow S but the reverse direction is also possible. At this time, a gap exists between the second shaft 68 and the wound cable 80, and then rotation of the second shaft 68 has no relation to the rotation of the wound cable 80. Before a bent 88, desirably being U-shaped, of the third part C reaches the vertical shaft 68 as shown in FIG. 6B, the third part C of cable 80 is continuously wound. Bent 88 is positioned at a point where cable 80 changes a direction of orientation from the second shaft 68 to the first shaft 60. Then the third part C is folded from a bending member 90 so that it is located or positioned behind and along the first horizontal shaft portion 64a as shown in FIG. 6C as viewed from a front direction relative to base 20 indicated by the arrow U in FIGS. 3 and 6C. Finally, the fourth part D of cable 80 is rotated about the first horizontal shaft portion 64a as shown in FIG. 6D to connect to a system unit 100 located in the base 20 as indicated by the arrow V in FIG. 6D. In this way, the cable 80 connected to the display screen 50 passes along the tilt/swivel hinge assembly or mechanism 25 and enters the base 20 of portable computer 10. In case of rotation of the display cover 40, the wound portion E (FIG. 6B) of cable 80 is tight and in the reverse situation, the wound portion E (FIG. 6B) is loose to turn in the original situation. If the third part C of the cable 80 were rotated about the reverse direction in a preferred embodiment, the wound portion E (FIG. 6B) of cable 80 would be loose in the rotation of the display cover 40 and in the reverse situation, the wound portion E (FIG. 6B) would be tight to turn in the original situation.

In accordance with a preferred embodiment of the present invention, the display cover 40, incorporating the display screen 50, is easily tilted and swivelled at any angle, and there is no need to turn the base 20 on working to show the display screen 50. The present invention is especially advantageous in that a user of the portable computer 10 is free to input the data with a stylus because a position of the display screen 50 faced upside relative to base 20 as shown in FIG. 1D, is possible in a preferred embodiment of the present intention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A portable computer, comprising:
   a base;
   a cover incorporating a display screen;
   a hinge assembly connecting said cover and said base, said hinge assembly including a first shaft horizontally oriented relative to said base and a second shaft oriented perpendicularly relative to said first shaft, said hinge assembly being rotatively movable about two axes of rotation to permit said cover to tilt about a first axis of rotation and to swivel about a second axis of rotation relative to said base; and
   a cable connecting said cover and said base electrically arranged to pass along and be wound about said hinge assembly.

2. The portable computer of claim 1, further comprised of said hinge assembly comprising:
   a pair of first blocks respectively located at opposing ends of said first shaft, said pair of first blocks coupling said first shaft to said base and permitting said cover to tilt about said first axis of rotation;
   a second block connecting said first shaft and permitting said cover to swivel about said second axis of rotation; and
   a support provided within said cover coupled to said second block by said second shaft to support said cover.

3. The portable computer of claim 2, further comprised of said portable computer further including a panel assembly protecting and enclosing said second block, said panel assembly being located between said base and said cover.

4. The portable computer of claim 2, further comprised of said cable including a U-shaped bent at a point where said cable changes a direction of orientation from said second shaft to said first shaft.

5. The portable computer of claim 2, further comprised of said cable including a first part, a second part, a third part, and a fourth part, said first part and said third part being oriented horizontally relative to said base when said cover is oriented perpendicularly to said base in an open position, and said second part and said fourth part being oriented vertically relative to said base when said cover is oriented perpendicularly to said base in an open position, said cable being arranged to pass along said second shaft and a part of said cable being wound about said second shaft until a bent of said cable reaches said second shaft, said bent being positioned at a point where said cable changes a direction of orientation from said second shaft to said first shaft, said third part of said cable being folded so that said third part of said cable is positioned behind and along said first shaft as viewed from a front direction relative to said base, said fourth part of said cable being rotatively wound in part about said first shaft.

6. The portable computer of claim 4, further comprised of said cable being divided into two separate lines at a middle portion of said cable and then folded to couple said cable to said hinge assembly.

7. The portable computer of claim 5, further comprised of said bent including a U-shaped bent at said point where said cable changes a direction of orientation from said second shaft to said first shaft.

8. The portable computer of claim 5, further comprised of said cable being divided into two separate lines at a middle portion of said cable and then folded to couple said cable to said hinge assembly.

9. A portable computer, comprising:

a base;

a cover incorporating a display screen;

a hinge assembly connecting said cover and said base, said hinge assembly including a first shaft horizontally oriented relative to said base and a second shaft oriented perpendicularly relative to said first shaft, said hinge assembly being rotatively movable about two axes of rotation to permit said cover to tilt about a first axis of rotation and to swivel about a second axis of rotation relative to said base; and a cable connecting said cover and said base electrically arranged to pass along and be wound about said hinge assembly, said cable including a first part, a second part, a third part, and a fourth part, said first part and said third part being oriented horizontally relative to said base when said cover is oriented perpendicularly to said base in an open position, and said second part and said fourth part being oriented vertically relative to said base when said cover is oriented perpendicularly to said base in an open position, said cable being arranged to pass along said second shaft and a part of said cable being wound about said second shaft until a bent of said cable reaches said second shaft, said bent being positioned at a point where said cable changes a direction of orientation from said second shaft to said first shaft, said third part of said cable being folded so that said third part of said cable is positioned behind and along said first shaft as viewed from a front direction relative to said base, said fourth part of said cable being rotatively wound in part about said first shaft.

10. The portable computer of claim 9, further comprised of said bent including a U-shaped bent at said point where said cable changes a direction of orientation from said second shaft to said first shaft.

11. The portable computer of claim 9, further comprised of said cable being divided into two separate lines at a middle portion of said cable and then folded to couple said cable to said hinge assembly.

12. The portable computer of claim 9, further comprised of said portable computer further including a panel assembly protecting and enclosing said first shaft, said panel assembly being located between said base and said cover.

13. The portable computer of claim 9, further comprised of said cable being connected to a system unit located in said base.

14. The portable computer of claim 9, further comprised of said fourth part of said cable being connected to a system unit located in said base.

15. A portable computer, comprising:

a base;

a cover incorporating a display screen;

a hinge assembly connecting said cover and said base, said hinge assembly including a fixing shaft and a rotation shaft coupled to the fixing shaft, the rotation shaft being capable of tilting and swiveling; and a cable connecting said base and said cover electrically arranged to pass along and be wound about said hinge assembly.

16. The portable computer of claim 15, further comprised of said hinge assembly comprising:

a pair of fixing members located at opposing ends of said fixing shaft, said pair of fixing members being coupled to said base to fix said fixing shaft;

a rotation block coupled to said rotation shaft, said rotation block including a pair of tilting members allowing the rotation shaft to be freely tilted within a predetermined regular angle; and a support provided within said cover and supported by said rotation shaft.

17. A method for forming a tilt and swivel assembly for a portable computer, comprising the steps of:

providing a base;

providing a cover incorporating a display screen;

connecting said cover and said base by a hinge assembly, said hinge assembly including a first shaft horizontally oriented relative to said base and a second shaft oriented perpendicularly relative to said first shaft, said hinge assembly being rotatively movable about two axes of rotation to permit said cover to tilt about a first axis of rotation and to swivel about a second axis of rotation relative to said base; and electrically connecting said cover and said base by a cable arranged to pass along and be wound about said hinge assembly.

18. The method of claim 17, further comprised of said step of connecting said cover and said base by said binge assembly further comprising the steps of:

coupling said first shaft to said base by a pair of first blocks respectively located at opposing ends of said first shaft to permit said cover to tilt about said first axis of rotation;

connecting said first shaft by a second block to permit said cover to swivel about said second axis of rotation; and providing a support within said cover and coupling said support to said second block by said second shaft to support said cover.

19. The method of claim 18, further comprising the step of protecting and enclosing said second block by a panel assembly, said panel assembly being located between said base and said cover.

20. The method of claim 18, further comprised of said electrically connecting step further comprising the step of providing a U-shaped bent in said cable at a point where said cable changes a direction of orientation from said second shaft to said first shaft.

21. The method of claim 18, further comprised of said electrically connecting step further comprising the steps of:

forming said cable to include a first part, a second part, a third part and a fourth part, said first part and said third part of said cable being oriented horizontally relative to said base when said cover is oriented perpendicularly to said base in an open position, and said second part and said fourth part of said cable being oriented vertically relative to said base when said cover is oriented perpendicularly to said base in an open position;

passing said cable along said second shaft and winding a part of said cable about said second shaft until a bent of said cable reaches said second shaft, said bent being positioned at a point where said cable changes a direction of orientation from said second shaft to said first shaft;

folding said third part of said cable so that said third part of said cable is positioned behind and along said first shaft as viewed from a front direction relative to said base; and winding rotatively said fourth part of said cable in part about said first shaft.

22. The method of claim 20, further comprised of said electrically connecting step further comprising the step of dividing said cable into two separate lines at a middle portion of said cable and then folding said cable to couple said cable to said hinge assembly.

23. The method of claim 21, further comprised of connecting said cable to a system unit located in said base.

24. The method of claim 21, further comprised of connecting said fourth part of said cable to a system unit located in said base.

25. The method of claim 21, further comprising the step of protecting and enclosing said second block by a panel assembly, said panel assembly being located between said base and said cover.

26. A method for forming a tilt and swivel assembly for a portable computer, comprising the steps of:

providing a base;

providing a cover incorporating a display screen;

connecting said cover and said base by a hinge assembly, said hinge assembly including a first shaft horizontally oriented relative to said base and a second shaft oriented perpendicularly relative to said first shaft, said hinge assembly being rotatively movable about two axes of rotation to permit said cover to tilt about a first axis of rotation and to swivel about a second axis of rotation relative to said base; and electrically connecting said cover and said base by a cable arranged to pass along and be wound about said hinge assembly, said electrically connecting step further comprising the steps of:

forming said cable to include a first part, a second part, a third part and a fourth part, said first part and said third part of said cable being oriented horizontally relative to said base when said cover is oriented perpendicularly to said base in an open position, and said second part and said fourth part of said cable being oriented vertically relative to said base when said cover is oriented perpendicularly to said base in an open position;

passing said cable along said second shaft and winding a part of said cable about said second shaft until a bent of said cable reaches said second shaft, said bent being positioned at a point where said cable changes a direction of orientation from said second shaft to said first shaft;

folding said third part of said cable so that said third part of said cable is positioned behind and along said first shaft as viewed from a front direction relative to said base; and winding rotatively said fourth part of said cable in part about said first shaft.

27. The method of claim 26, further comprising the step of protecting and enclosing said first shaft by a panel assembly, said panel assembly being located between said base and said cover.

28. The method of claim 26, further comprised of connecting said cable to a system unit located in said base.

29. The method of claim 28, further comprising the step of protecting and enclosing said first shaft by a panel assembly, said panel assembly being located between said base and said cover.

* * * * *